United States Patent
Hashimura et al.

(10) Patent No.: US 10,513,296 B2
(45) Date of Patent: Dec. 24, 2019

(54) STRUCTURE AND STRUCTURE MEMBER INCLUDING JOINT STRUCTURE OF DISSIMILAR MATERIALS

(71) Applicant: Kobe Steel, Ltd., Hyogo (JP)

(72) Inventors: Toru Hashimura, Kobe (JP); Junya Naitou, Kobe (JP); Ryohei Yukishige, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/747,322

(22) PCT Filed: Jul. 20, 2016

(86) PCT No.: PCT/JP2016/071251
§ 371 (c)(1),
(2) Date: Jan. 24, 2018

(87) PCT Pub. No.: WO2017/033626
PCT Pub. Date: Mar. 2, 2017

(65) Prior Publication Data
US 2018/0215420 A1 Aug. 2, 2018

(30) Foreign Application Priority Data
Aug. 24, 2015 (JP) ................. 2015-164967

(51) Int. Cl.
*B60J 7/00* (2006.01)
*B62D 27/02* (2006.01)
(Continued)

(52) U.S. Cl.
CPC .......... *B62D 27/023* (2013.01); *B62D 25/06* (2013.01); *B62D 25/08* (2013.01); *B62D 27/026* (2013.01);
(Continued)

(58) Field of Classification Search
CPC ... H01L 2924/00014; H01L 2924/0002; H01L 2924/00; H01L 2224/05571; C08F 257/02;
(Continued)

(56) References Cited

U.S. PATENT DOCUMENTS 4,883,310 A * 11/1989 Miyazaki ............... B62D 25/06
296/210
5,873,618 A * 2/1999 Ejima .................... B62D 25/04
296/30
(Continued)

FOREIGN PATENT DOCUMENTS

CN 104228975 A 12/2014
DE 10 2004 019 818 A1 12/2005
(Continued)

OTHER PUBLICATIONS

Notification Concerning Transmittal of International Preliminary Report on Patentability (Chapter I) and Translation of Written Opinion of the International Searching Authority; PCT/JP2016/071251; dated Mar. 8, 2018.
(Continued)

*Primary Examiner* — Kiran B Patel
(74) *Attorney, Agent, or Firm* — Studebaker & Brackett PC (57) ABSTRACT

Structure including joint structure of dissimilar materials comprises a roof panel and a skeletal body. The roof panel has a bent portion at its end and is a panel member made of an aluminum alloy. The skeletal body has a support portion for supporting the first member and is made of steel. The roof panel and the skeletal body are joined by continuous welding of a vicinity of an apex of the bent portion of the roof panel and the support portion of the skeletal body, a
(Continued)

reinforcing plate is joined to the roof panel at least partially along the joining portion with the skeletal body.

15 Claims, 8 Drawing Sheets

(51) Int. Cl.
*B62D 25/06* (2006.01)
*B62D 25/08* (2006.01)
*B62D 29/00* (2006.01)

(52) U.S. Cl.
CPC ......... *B62D 29/005* (2013.01); *B62D 29/007* (2013.01); *B62D 29/008* (2013.01)

(58) Field of Classification Search
CPC ............... B23K 2103/20; B23K 11/20; B23K 2103/10; B23K 2103/18; B23K 26/323
USPC .................................................. 296/193.01
See application file for complete search history.

(56) References Cited

U.S. PATENT DOCUMENTS

| | | | | |
|---|---|---|---|---|
| 6,254,174 B1* | 7/2001 | Wee | ........................ | B62D 25/04 296/193.06 |
| 6,315,350 B1* | 11/2001 | Nakane | ............... | B60R 13/0225 280/751 |
| 6,328,376 B2* | 12/2001 | Son | ........................ | B62D 25/02 296/187.12 |
| 6,389,697 B1* | 5/2002 | Benoit | .................... | B21D 26/14 29/897.2 |
| 6,789,840 B2* | 9/2004 | Honma | .................. | B62D 25/06 296/187.12 |
| 6,962,389 B2* | 11/2005 | Katsuma | ................ | B62D 25/06 296/187.12 |
| 7,080,876 B2* | 7/2006 | Ido | ........................ | B62D 25/06 296/210 |
| 7,121,615 B2* | 10/2006 | Hoshino | ................ | B62D 25/04 296/203.03 |
| 7,182,381 B2* | 2/2007 | Ogawa | .................... | B62D 25/07 296/210 |
| 7,290,831 B2* | 11/2007 | Poss | ........................ | B62D 25/06 296/203.03 |
| 7,690,552 B2* | 4/2010 | Gendou | ................. | B21J 15/025 228/112.1 |
| 7,997,643 B2* | 8/2011 | Shah | ..................... | B62D 25/06 296/203.03 |
| 8,205,923 B2* | 6/2012 | Mourou | .............. | B60R 13/0206 296/1.08 |
| 8,322,771 B2* | 12/2012 | Mihai | ............... | B29C 66/74283 29/897.2 |
| 8,366,184 B2* | 2/2013 | Ogawa | ................. | B62D 21/157 296/193.06 |
| 8,740,290 B2* | 6/2014 | Takayama | ............... | B62D 25/02 296/146.6 |
| 8,820,824 B1* | 9/2014 | Hinz | .................... | B62D 29/008 296/187.13 |
| 8,915,540 B2* | 12/2014 | Nishimura | ............. | B62D 25/06 296/210 |
| 9,079,618 B2* | 7/2015 | Ishigame | ............... | B62D 25/04 |
| 9,126,632 B2* | 9/2015 | Ono | ........................ | B62D 25/06 |
| 9,394,018 B2* | 7/2016 | Kisaku | ................... | B62D 25/02 |
| 9,440,683 B1* | 9/2016 | Donabedian | ......... | B62D 27/023 |
| 9,452,786 B2* | 9/2016 | Hida | ...................... | B62D 25/02 |
| 9,475,444 B2* | 10/2016 | Berberoglu | ............ | B62D 25/06 |
| 9,643,655 B2* | 5/2017 | Saito | ....................... | B62D 25/04 |
| 10,077,081 B2* | 9/2018 | Kuwahara | .............. | B62D 25/06 |
| 2004/0046423 A1* | 3/2004 | Wieber | .................. | B62D 25/06 296/203.03 |
| 2006/0237997 A1* | 10/2006 | Wendler | ................. | B62D 25/06 296/193.04 |
| 2007/0200314 A1* | 8/2007 | Anderson | .............. | B62D 25/04 280/210 |
| 2008/0100100 A1* | 5/2008 | Huisman | .............. | B60R 13/0225 296/215 |
| 2008/0122259 A1* | 5/2008 | Matsui | ................. | B62D 21/157 296/187.12 |
| 2008/0178467 A1* | 7/2008 | Hayashi | ................ | B23K 11/115 29/897.2 |
| 2009/0294410 A1* | 12/2009 | Iwase | .................... | B21J 15/025 219/91.23 |
| 2010/0052369 A1* | 3/2010 | Park | ....................... | B60R 21/213 296/210 |
| 2010/0098969 A1* | 4/2010 | Hashimura | ............ | B21J 15/025 428/653 |
| 2010/0127532 A1* | 5/2010 | Hosaka | ................... | B62D 25/06 296/193.06 |
| 2010/0140982 A1* | 6/2010 | Hosaka | ................... | B62D 25/06 296/210 |
| 2010/0259073 A1* | 10/2010 | Gruneklee | ............. | B62D 25/06 296/225 |
| 2011/0121614 A1* | 5/2011 | Kobayashi | ........... | B62D 21/157 296/210 |
| 2011/0233970 A1* | 9/2011 | Nagai | .................... | B62D 25/02 296/203.03 |
| 2012/0061998 A1* | 3/2012 | Carsley | .................. | B62D 25/06 296/210 |
| 2012/0153676 A1* | 6/2012 | Shono | .................... | B62D 25/04 296/193.06 |
| 2012/0292950 A1* | 11/2012 | Stahlhut | ................. | B62D 25/06 296/210 |
| 2013/0309520 A1* | 11/2013 | Lang | ........................ | F16B 5/10 428/594 |
| 2014/0217783 A1* | 8/2014 | Hida | ...................... | B62D 25/06 296/210 |
| 2015/0137563 A1* | 5/2015 | Eberle | ....................... | B60R 9/04 296/215 |
| 2015/0217812 A1* | 8/2015 | Hinz | ..................... | B62D 25/06 296/210 |

FOREIGN PATENT DOCUMENTS

| | | |
|---|---|---|
| DE | 10 2006 030 507 A1 | 1/2008 |
| JP | 2001-191962 A | 7/2001 |
| JP | 2004-130986 A | 4/2004 |
| JP | 2004-306676 A | 11/2004 |
| JP | 2009-262198 A | 11/2009 |
| JP | 2011-161466 A | 8/2011 |
| JP | 2014-019275 A | 2/2014 |
| JP | 2014-073798 A | 4/2014 |
| JP | 2014-141220 A | 8/2014 |
| JP | 2015-107771 A | 6/2015 |

OTHER PUBLICATIONS

International Search Report issued in PCT/JP2016/071251; dated Oct. 4, 2016.
The extended European search report issued by the European Patent Office dated Apr. 1, 2019, which corresponds to European Patent Application No. 16838973.2-1016 and is related to U.S. Appl. No. 15/747,322.

* cited by examiner

STRUCTURE AND STRUCTURE MEMBER INCLUDING JOINT STRUCTURE OF DISSIMILAR MATERIALS

CROSS-REFERENCE TO RELATED APPLICATIONS

This is a national phase application in the United States of International Patent Application No. PCT/JP2016/071251 with an international filing date of Jul. 20, 2016, which claims priority of Japanese Patent Application No. 2015-164967 filed on Aug. 24, 2015 the contents of which are incorporated herein by reference.

TECHNICAL FIELD

The present invention relates to a structure and a structure member including joint structure of dissimilar materials.

BACKGROUND ART

A vehicle body fully made of aluminum is known to achieve weight reduction to improve fuel efficiency and motion performance of a vehicle. However, the weight reduction achieved by such an all-aluminum vehicle body accompanies a considerable rise in production costs. In recent years, a method of designing and manufacturing so-called multi-material vehicles has been attracting attention as a way of reducing weight of vehicles without a large increase in cost, and production of such vehicles has already been performed. In the designing and manufacturing method, steel and other lightweight materials, such as aluminum, magnesium, or resin products including fiber-reinforced plastic (FRP) and carbon fiber reinforced plastic (CFRP), are combined in a single vehicle.

In the case where the same steel materials as in the conventional vehicle bodies are to be used for the most part of the framework of a vehicle body and an aluminum panel is to be partly used, it is necessary to join dissimilar metals together. For example, when a roof, an upper back, and the like made of aluminum alloy are to be joined to a steel framework, joining dissimilar metals together, i.e. joining an aluminum panel member to the steel framework is necessary.

Rivets such as self-piercing rivets, blind rivets, bolts, punching screws, caulking joints, or the like are used to form such a joining portion of dissimilar materials. However, such joining techniques all belong to spot joining and require an additional waterproofing process using a suitable sealing resin agent or the like when applied for an outer plate part, a floor part, a chassis part, or the like which is exposed to rainwater. In addition, applying an adhesive is applied between the members can be required to prevent corrosion.

JP 2014-73798 A relates to dissimilar metal joining for joining an aluminum panel member to a steel framework, and discloses joint structure for an automobile in which a roof panel made of aluminum alloy is joined to a steel framework member by melt-bonding. The dissimilar metal joining of JP 2014-73798 A employs linear joining to prevent infiltration of rainwater and to ensure strength reliability.

SUMMARY OF THE INVENTION

However, in the joining method of melting a solvent or a base material by using a heat source such as MIG (Metal Inert Gas) or a laser, heat is locally applied to the periphery of the junction during bonding. When such a joining method is applied to joining an aluminum panel member to a steel frame, due to a difference in coefficient of linear expansion between aluminum and a steel material, the aluminum panel member composed of a thin plate undergoes thermal deformation, and after the joining, residual deformation and residual strain occur. As a result, warpage and ripples are generated in the aluminum panel member.

A problem to be solved by the present invention is to suppress deformation caused by local expansion due to welding heat while ensuring corrosion resistance and strength reliability in the joint structure of dissimilar materials.

A First aspect of the present invention provides Structure including joint structure of dissimilar materials comprising: a first member which has a bent portion at its end and is a panel member made of an aluminum alloy; and a second member which has a support portion for supporting the first member and is made of steel, wherein the first member and the second member are joined by continuous welding of a vicinity of an apex of the bent portion of the first member and the support portion of the second member, and wherein a reinforcing plate is joined to the first member at least partially along the joining portion with the second member.

Deformation of the first member caused by local expansion due to welding heat can be suppressed by joining the reinforcing plates along the joining portions of the first member. Specifically, warping and ripple deformation of an aluminum panel, which is likely to occur in the aluminum panel due to welding heat or joining heat generated during arc joining or laser joining of dissimilar materials, can be suppressed. Further, the continuous welding enables dissimilar materials respectively made of steel alloy and made of aluminum alloy to be linearly joined together. Therefore, infiltration of rainwater from the joining portion and corrosion of the inner members can be prevented and the strength reliability of the joining portion can be improved. As a result, aluminum alloy can be used for a part of the structure without a large increase in the plate thickness, that is, without a large increase in the weight. Therefore, weight reduction of the entire structure can be achieved easily. The term "welding" used herein shall be interpreted in a broad meaning, and includes brazing and soldering in addition to general welding. The vicinity of the apex of the bent portion indicates a vicinity region including the apex as well as a region where a welding material such as a brazing material is usually sticked when welding the apex.

Preferably, the continuous welding is a brazing joint using a flux cored wire.

Using the flux cored wire (FCW) as the brazing material improves the reliability of dissimilar material joining between the steel and the aluminum alloy and enables the dissimilar material to be linearly joined. Further, since the welding can be performed at a lower temperature than conventional, the influence of the deformation caused by the welding heat can be reduced. FCW is a wire filled with flux inside an aluminum alloy clad material.

The reinforcing plate may be made of an aluminum alloy and joined to the first member with an adhesive.

The reinforcing plate made of aluminum alloy can be reduced in weight as compared with the case where the reinforcing plate is made of steel, and can be improved in strength as compared with the case where the reinforcing plate is made of resin.

The reinforcing plate may be made of resin and joined to the first member with an adhesive.

The reinforcing plate made of resin can be reduced in weight as compared with the case where the reinforcing plate is made of metal.

Preferably, the reinforcing plate is disposed with a gap from the joining portion between the first member and the second member.

The gap provided between the joining portion and the reinforcing plate can prevent the deformation of the reinforcing plate, the combustion of the reinforcing plate made of resin, and the combustion of the adhesive between the panel member and the reinforcing plate, which are due to the heat accompanied by the welding.

The structure may be a vehicle body. In particular, the first member may be a roof or an upper back of the vehicle body.

In practice, joining of dissimilar materials is often performed for a vehicle body. In particular, since the roof panel or the upper back has a large area, substitution of aluminum alloy members for steel members is highly effective in weight reduction.

The first member may be made of an aluminum alloy of 6000 series or 5000 series. The second member may also be a surface-treated steel sheet such as a hot dip galvannealed steel sheet, a hot-dip galvanized steel sheet, or a hot-dip aluminum steel sheet, and may also be a non-plated steel sheet.

In joining of dissimilar materials, the first member is often made of an aluminum alloy of 6000 series or 5000 series, and the second member is often a hot dip galvannealed steel sheet or a hot-dip galvanized steel sheet, which can reduce the cost and facilitate processing. Alternatively, the second member can be a hot-dip aluminum steel sheet or a non-plated steel sheet which has relatively good bondability with an aluminum alloy.

A second aspect of the present invention provides structure member including joint structure of dissimilar materials composed of a first member which has a bent portion at its end and is a panel member made of an aluminum alloy and a second member which has a support portion for supporting the first member and is made of steel, wherein the first member and the second member are joined by continuously welding the vicinity of the apex of the bent portion of the first member and the support portion of the second member.

The present invention can be applied not only to structures such as car bodies but also to structural members itself.

According to the present invention, in joint structure of dissimilar materials, a reinforcing plate is joined to a first member along a joining portion formed by continuous welding can suppress deformation caused by local expansion due to welding heat while ensuring corrosion resistance and strength reliability.

MODE FOR CARRYING OUT THE INVENTION

First Embodiment

Embodiments of the present invention will be described below with reference to the accompanying drawings.

Figure 1:
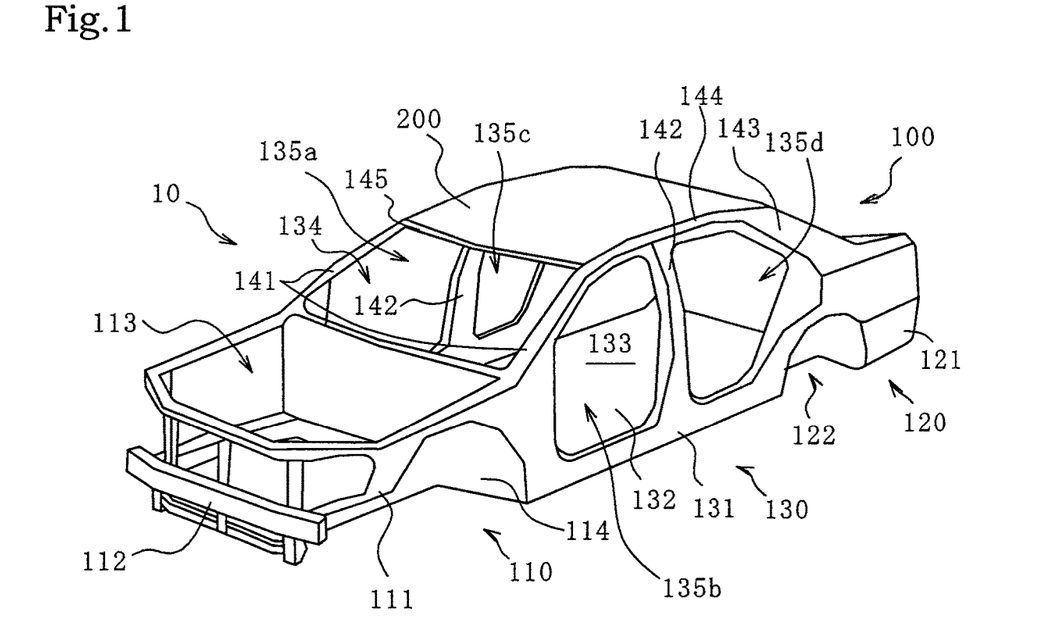
FIG. 1 is a perspective view of a vehicle body according to a first embodiment of the present invention.
Figure 2:
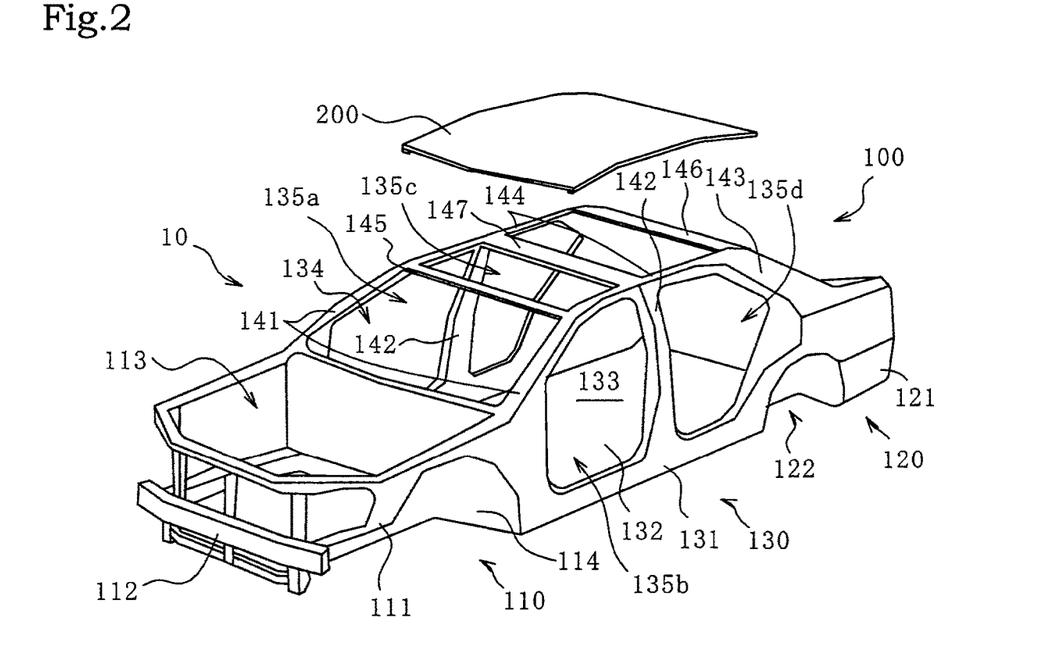
FIG. 2 is an exploded view of the roof panel of the vehicle body of FIG. 1.

Referring to FIGS. 1 and 2, the present embodiment describes a vehicle body (structure) 10 including a structure in which a roof panel (first member) 200 made of aluminum alloy is joined to a skeletal body (second member) 100 made of steel.

As shown in FIGS. 1 and 2, the vehicle body 10 of the present embodiment includes the skeletal body 100 serving as a framework of the vehicle body 10 and a roof panel 200 mounted on and joined to the skeletal body 100.

The skeletal body 100 consists of a hot dip galvannealed (GA) steel sheet and constitutes a framework of the entire vehicle body 10. The skeletal body 100 includes a front part 110, a rear part 120, and a center part 130. The material of the skeletal body 100 is not limited to the GA steel sheet, and may be a hot-dip galvanized (GI) steel sheet, a hot-dip aluminum steel sheet, or non-plated steel sheet.

The front part 110 is a part that is disposed at the front of the vehicle body 10 and includes a front frame 111 and a front bumper 112. The front frame 111 constitutes a framework of the front part 110, and includes an engine accommodating portion 113 at the center thereof in which an engine (not shown) or the like is installed, and includes front-wheel accommodating portions 114, each of which accommodates one of a front wheels (not shown), on both sides in a vehicle-width direction of the front frame 111. The front bumper 112 is disposed in the vehicle-width direction and fixed in front of the front frame 111.

The rear part 120 is a part that is disposed at the rear of the vehicle body 10 and includes a rear frame 121 and an upper back (not shown). The rear frame 121 constitutes a framework of the rear part 120, and includes a trunk portion (not shown) at the rear center thereof, and rear-wheel accommodating portions 122, each of which accommodates one of the rear wheels (not shown), on both sides in the width direction of the rear frame 121.

The center part 130 is a part disposed at the center of the vehicle body 10, and includes a center frame 131 and a floor panel 132. The center frame 131 constitutes a framework of the center part 130, and includes a cabin 133 at the center thereof for boarding a user to ride. The center frame 131 includes front pillars 141, center pillars 142, rear pillars 143, roof side rails 144, a roof front rail 145, a roof rear rail 146, and a roof cross member 147. A windshield portion 134, door portions 135a to 135d, and a rear glass portion 136 (see FIG. 3) are formed with these members. The floor panel 132 is located at the bottom of the center part 130 and constitutes the floor part of the cabin 133.

Each of the front pillars 141 is a columnar portion disposed along one of the side end portions of the windshield portion 134 and along the front end portion of one of the door portions 135a, 135b. Each of the center pillars 142 is a columnar portion disposed between the rear end portion of one of the door portions 135*a*, 135*b* and the front end portion of one of the door portions 135*c*, 135*d*. Each of the rear pillars 143 is a columnar portion disposed between the rear end portion of one of the door portions 135*c*, 135*d* and the front end portion of the rear glass portion 136.

Each of the roof side rails 144 is disposed in a front-rear direction of the vehicle body 10 and fixed to and extends over the upper end portions of the pillars 141 to 143. Each of the roof side rails 144 is disposed along one of the side end portions of the roof panel 200 and is joined to the roof panel 200.

The roof front rail 145 is disposed in the vehicle-width direction and fixed between the upper end portions of the left and right front pillars 141. The roof front rail 145 is disposed along the upper end portion of the windshield portion 134 and along the front end portion of the roof panel 200 and is joined to the roof panel 200.

The roof rear rail 146 is disposed in the vehicle-width direction and fixed between the upper end portions of the left and right rear pillars 143. The roof rear rail 146 is disposed along the rear end portion of the roof panel 200 and is joined to the roof panel 200.

Figure 3:
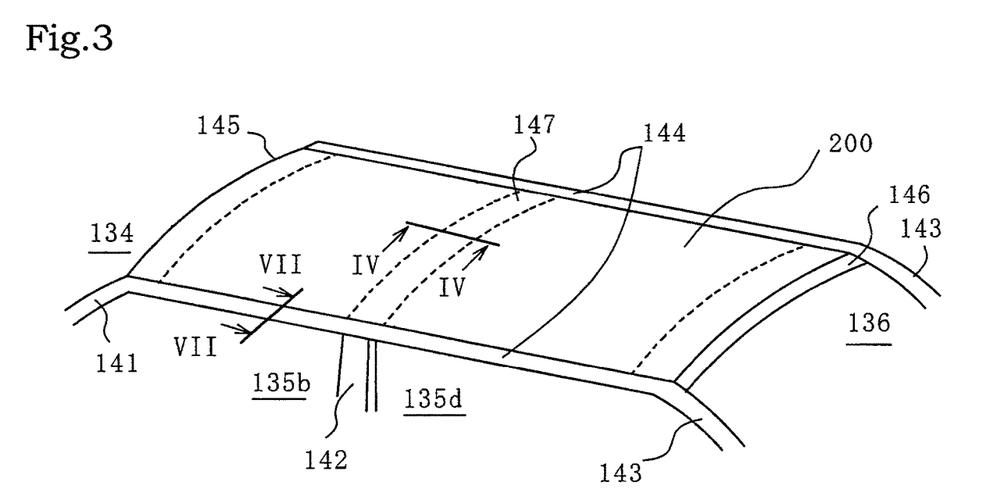
FIG. 3 is an enlarged view of the roof panel of the vehicle body of FIG. 1.
Figure 4:
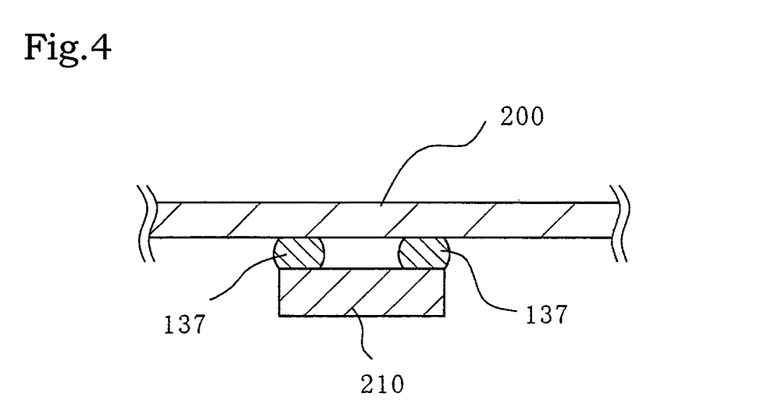
FIG. 4 is a cross-sectional view taken along line IV-IV of FIG. 3.

As shown in FIGS. 2 and 3, the roof cross member 147 extends in the vehicle-width direction between the left and right roof side rails 144. The roof cross member 147 is disposed and fixed between the upper end portions of the left and right center pillars 142. As shown in FIG. 4, the roof cross member 147 is not in direct contact with the roof panel 200 and is joined to the roof panel 200 via resin cushioning members 137.

The roof panel 200 is an exterior panel covering the upper side of the vehicle body 10. The roof panel 200 is press-formed and made of 5000 series aluminum alloy, and in the present embodiment, the thickness thereof is in a range of about 1.0 mm to 1.3 mm. The side end portions, the front end portion, and the rear end portion of the roof panel 200 are respectively welded and joined to the roof side rails 144, the roof front rail 145, the roof rear rail 146, and the roof cross member 147 of the center frame 131. The welded joining procedure is performed continuously, that is, continuous welding. The details of the continuous welding will be described later. The material of the aluminum alloy is not limited to 5000 series and may be 6000 series, and the size thereof is not limited either. In the present embodiment, the roof panel 200 is a first member of the present invention, and the center frame 131 is a second member of the present invention.

Figure 5:
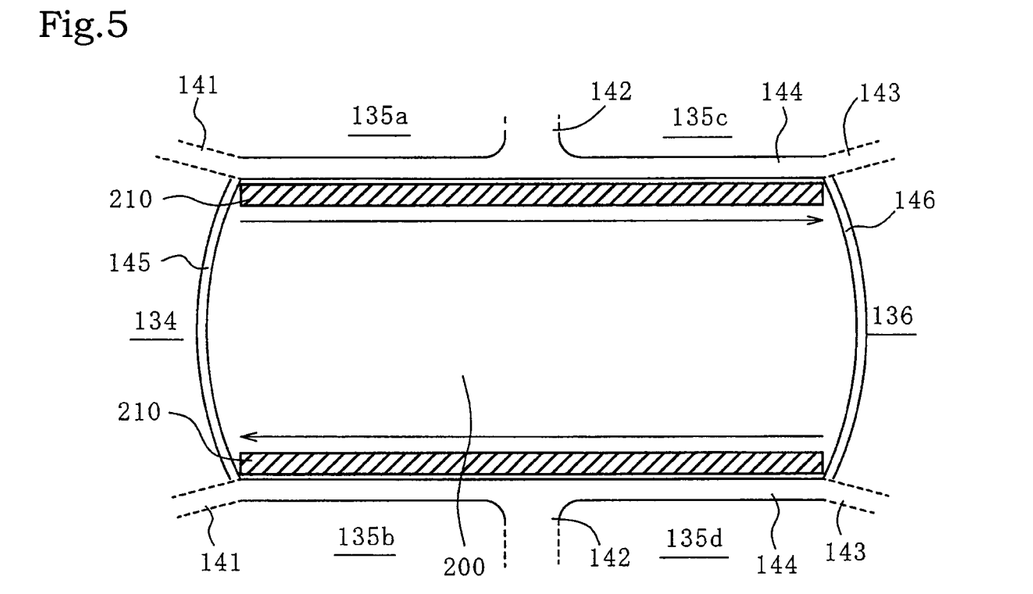
FIG. 5 is a schematic view showing the arrangement of a reinforcing plate with respect to the roof panel.

As shown in FIG. 5, reinforcing plates 210 having a band shape are disposed on the back surface of the roof panel 200. The reinforcing plates 210 are made of aluminum alloy and are joined to the roof panel 200 with an adhesive. Although the reinforcing plates 210 in the present embodiment are made of aluminum alloy in terms of weight and strength, the reinforcing plates 210 may be made of resin, which is lighter than aluminum alloy, and the sizes thereof are not limited either. In addition, bonding of the reinforcing plates 210 to the roof panel 200 is not limited to an adhesive-bonding, and welded-joining, mechanical fastening, or the like may be used. The reinforcing plates 210 of the present embodiment are disposed in the front-rear direction of the vehicle body 10 along the joining portions between the roof panel 200 and the roof side rails 144. The reinforcing plates 210 are provided to suppress deformation of the joining portions.

There is a difference in the coefficient of linear expansion between an aluminum alloy material and a steel material, and the coefficient of linear expansion of an aluminum alloy material is approximately twice that of a steel material. Accordingly, the amount of local thermal expansion of the aluminum alloy material is larger than that of the steel material, and thus the joining portions can deform easily. Such local deformation with varying degrees causes a problem when an aluminum alloy material is used as an outer plate or the like that requires a high quality joining process, which results in one reason for the slow progress in partly using aluminum alloy in a vehicle body. The local deformation as described above can be suppressed by increasing the thickness of the aluminum alloy plate, but such a countermeasure lessens weight reduction and increases material costs.

Deformation of the roof panel 200 caused by local expansion due to welding heat can be suppressed by joining the reinforcing plates 210 joined to the roof panel 200 along the joining portions. Specifically, warping and ripple deformation of the roof panel 200, which is likely to occur in the roof panel 200 due to welding heat or joining heat generated during arc joining or laser joining of different or dissimilar materials, can be suppressed. Further, the continuous welding of the roof panel 200 and the skeletal body 100 as shown by the arrows in FIG. 5 enables dissimilar materials of the skeletal body 100 (center frame 131) made of steel and the roof panel 200 made of aluminum alloy to be linearly joined together. Therefore, infiltration of rainwater from the joining portion and corrosion of the inner members can be prevented and the strength reliability of the joining portion can be improved. As a result, aluminum alloy can be used for a part of the vehicle body 10 without a large increase of the plate thickness, that is, without a large increase of the weight. Therefore, weight reduction of the entire vehicle body 10 can be achieved easily. The term "welding" used herein shall be interpreted in a broad meaning, and includes brazing and soldering in addition to general welding.

In addition, the reinforcing plates 210 made of aluminum alloy can be reduced in weight as compared with the reinforcing plates 210 made of steel, and can be increased in strength as compared with the reinforcing plates 210 made of resin. In order to further reduce the weight, the reinforcing plates 210 may be made of resin.

Figure 6:
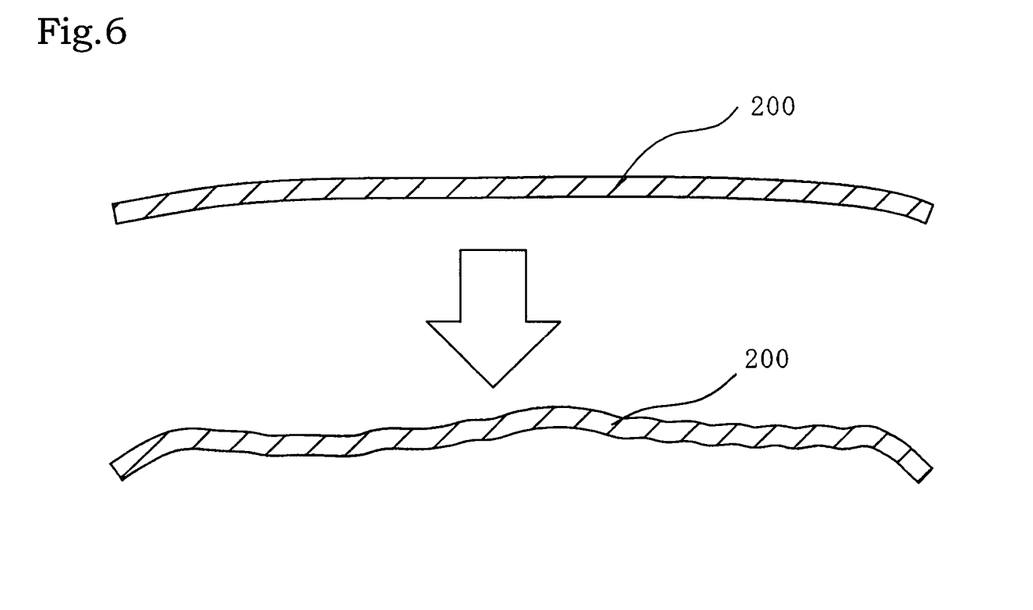
FIG. 6 shows deformation of the roof panel due to thermal expansion.

FIG. 6 shows an example of deformation of the roof panel 200 at the joining portion in the case where the reinforcing plate 210 is not provided. The end portion of the roof panel 200 in the state after the joining shown in the lower side of FIG. 6 is deformed into a wavy shape due to the welding heat (the deformation amount is displayed in an enlarged manner) as compared with the state before the joining shown on the upper side of FIG. 6.

Figure 7:
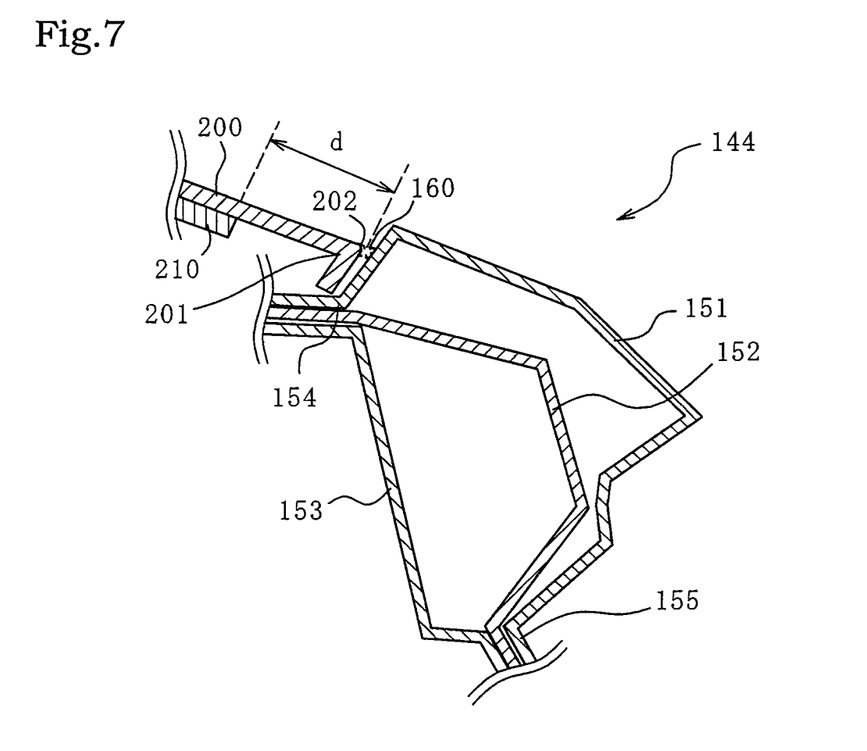
FIG. 7 is a cross-sectional view taken along line VII-VII of FIG. 3.

As shown in FIG. 7, each of the roof side rails 144 includes an outer panel 151, an inner panel 152, and a reinforcement 153. The outer panel 151 is an exterior panel constituting the upper part of the roof side rail 144 and is exposed on the outer surface of the vehicle body 10. The inner panel 152 is a panel constituting the lower part of the roof side rail 144. The outer panel 151 and the inner panel 152 are joined together by welding at a support portion 154 positioned on the inner side in the vehicle-width direction and at a flange portion 155 positioned at the lower side in the height direction, and constitute a closed cross section. The reinforcement 153 is disposed inside each of the roof side rails 144 for reinforcement. In the support portion 154 and the flange portion 155, both ends of the reinforcement 153 are overlaid by the outer panel 151 and the inner panel 152, and are welded in a three-layered state.

The roof panel 200 includes a bent portion 201 of which end is bent. The bent portion 201 is bent inward at an angle in a range of 120 degrees to 150 degrees with respect to the outer surface of the roof panel 200. The bent portion 201 is placed on the support portion 154 of the roof side rail 144 and is joined by welding the vicinity of an apex 202 of the bent portion 201 to the support portion 154 through a brazing material 160.

The support portion 154 forms a stepped recessed portion with respect to the surface of the roof side rail 144, and the recessed portion supports the bent portion 201 of the roof panel 200. Since the roof panel 200 is supported by the recessed portion of the support portion 154, the roof panel 200 and the surface of the roof side rail 144 can be roughly flush with each other, so that the beautiful appearance can be maintained.

A flux cored wire (FCW) is used for welding the vicinity of the apex 202 of the bent portion 201 described above and the support portion 154. FCW is a wire filled with flux inside an aluminum alloy clad material.

Using FCW for joining improves the reliability of dissimilar material joining between the skeletal body 100 made of steel member and the roof panel 200 made of aluminum alloy member and enables the dissimilar material to be linearly joined. Further, since the welding can be performed at lower temperatures than conventional, the influence of the deformation caused by the welding heat as shown in FIG. 6 can be reduced. In addition, the bent portion 201 and the support portion 154 can be welded and joined together, which eliminates the need for a member such as a molding or the like which impairs the beautiful appearance and is conventionally required for concealing the portions fastened with rivets or the like to join the dissimilar materials.

The reinforcing plate 210 is disposed with a gap of a distance d from the joining portion. The distance d is a distance enough to prevent deformation of the reinforcing plate 210 due to the influence of the heat generated during welding and joining, the adhesive from being thermally affected, and melting or burning of a part of the reinforcing plate in the case where the reinforcing plate is made of resin. Further, the distance d is a distance enough to prevent deformation of the roof panel 200 during joining, and in the present embodiment, the distance d is from 10 mm to 25 mm. In this way, a gap provided between the joining portion and the reinforcing plate 210 can prevent occurrence of a fault in the reinforcing plate 210 due to the heat accompanied by the welding.

Figure 8:
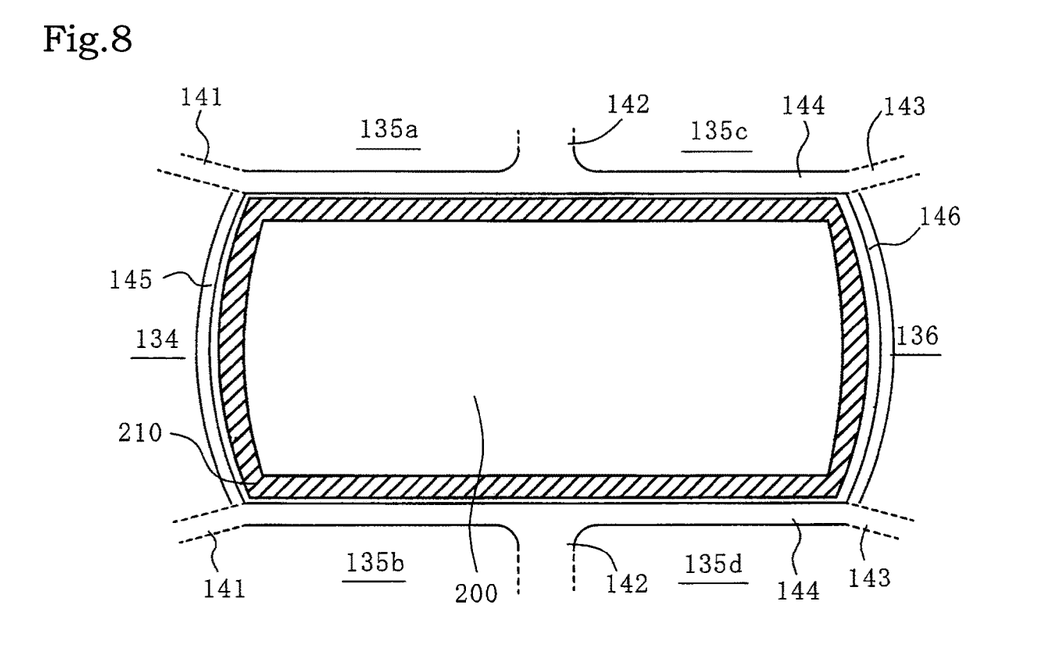
FIG. 8 is a schematic view showing a variation relating to the arrangement of the reinforcing plate.
Figure 9:
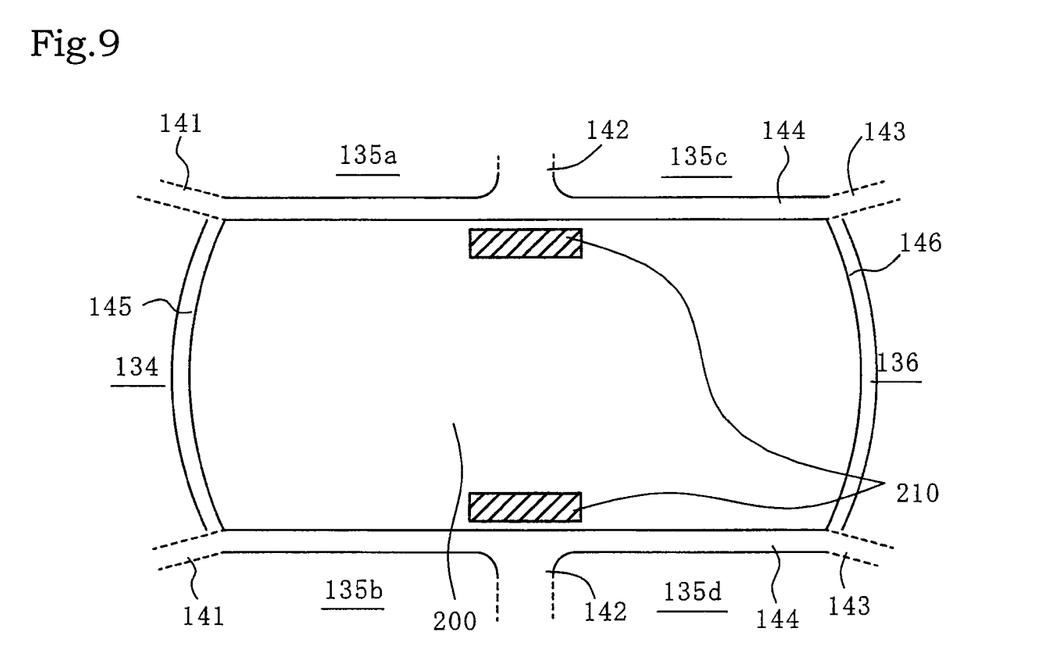
FIG. 9 is a schematic view showing another variation relating to the arrangement of the reinforcing plate.
Figure 10:
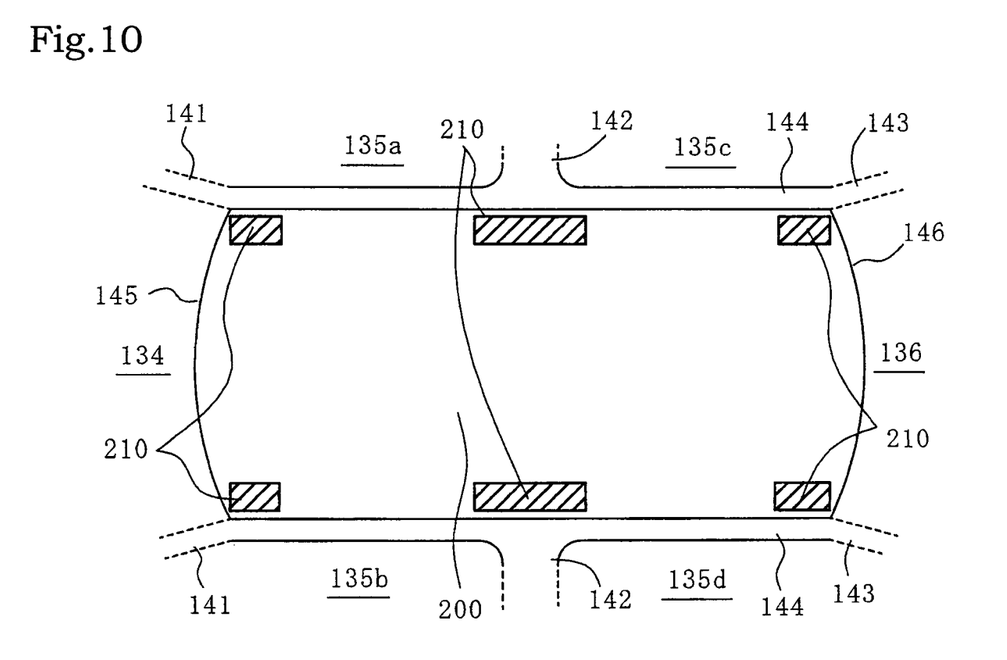
FIG. 10 is a schematic view showing still another variation relating to the arrangement of the reinforcing plate.

Further, various changes can be made to the arrangement of the reinforcing plate 210. The reinforcing plate 210 may be arranged around the entire periphery of the roof panel 200 (see FIG. 8) in order to further suppress the deformation, may be arranged only in the vicinity of the center pillars 142 having a large deformation amount (see FIG. 9), or may be arranged only in the vicinity of the pillars 141 to 143 also having large deformation amounts (see FIG. 10). Such joining of the reinforcing plate 210 and the roof panel 200 is not necessarily incorporated in the assembly process of the vehicle body 10, but may be taken into the assembly process of the vehicle body 10 as a structure member that has been previously joined together in a separate process.

Second Embodiment

Figure 11:
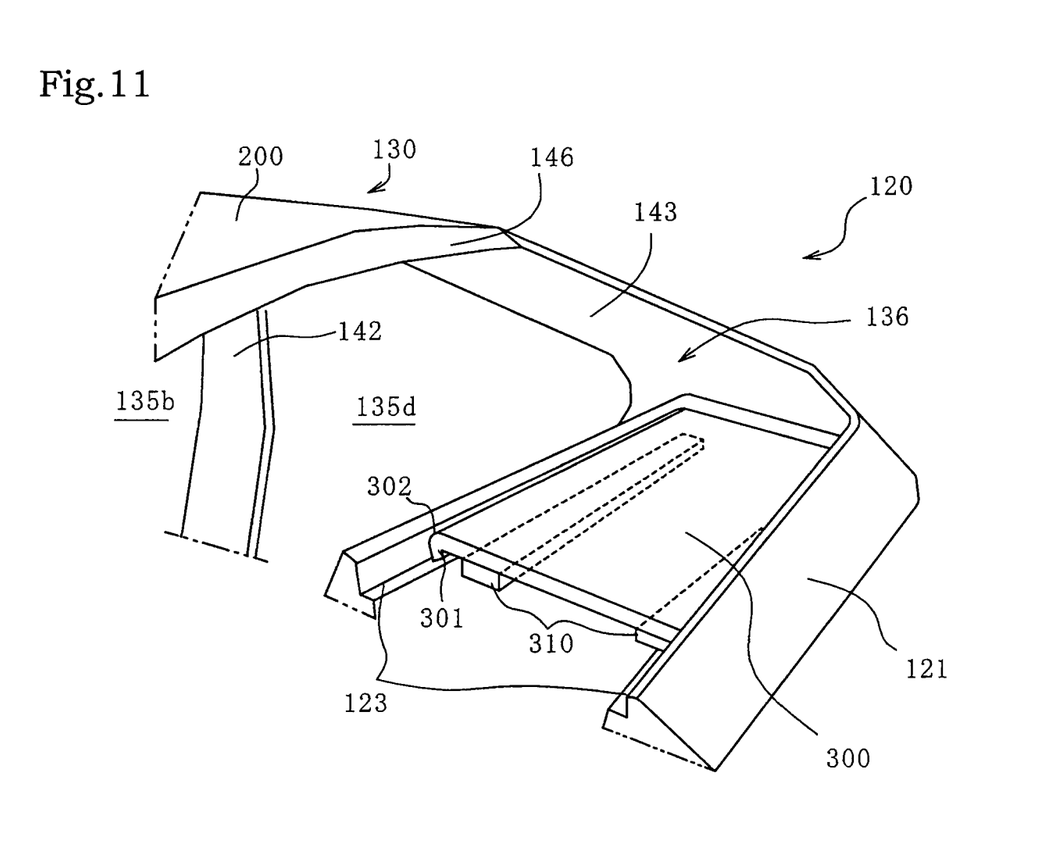
FIG. 11 is a perspective view of the periphery of the upper back of the vehicle body according to the second embodiment of the present invention.

FIG. 11 shows the periphery of an upper back 300 of the vehicle body 10 according to a second embodiment. In the present embodiment, the upper back 300 and the rear frame 121 are welded and joined together in the same manner as the joining of the roof panel 200 and the center frame 131 according to the first embodiment. The configuration of the vehicle body 10 is substantially the same as that of the first embodiment shown in FIGS. 1 and 2. Therefore, the description of the same parts as those of the vehicle body 10 shown in FIGS. 1 and 2 will be omitted.

The upper back 300 and the rear frame 121 are joined together by continuous welding in the same manner as the joining of the roof panel 200 and the center frame 131 according to the first embodiment. Therefore, in the present embodiment, the upper back 300 is a first member of the present invention, and the rear frame 121 is a second member of the present invention.

On the back surface (the lower surface in the figure) of the upper back 300, reinforcing plates 310 having a band shape are disposed along the joining portions. The reinforcing plates 310 are made of aluminum alloy and are joined to the upper back 300 with an adhesive. The reinforcing plates 310 are disposed separately from the joining portions with a distance enough to prevent deformation of the reinforcing plates 310 under the influence of the heat generated at the time of welded joining and also prevent deformation of the upper back 300 at the time of the joining. In the present embodiment, the distance is in a range of 10 mm to 30 mm.

In the present embodiment, the reinforcing plates 310 are made of aluminum alloy in terms of weight and strength, but may be made of resin or the like which is lighter than aluminum alloy, and the sizes thereof are not limited either. In addition, bonding of the reinforcing plates 310 to the upper back 300 is not limited to an adhesive-bonding, and welded-joining, mechanical fastening, or the like may be used.

The upper back 300 is a panel made of 5000 series aluminum alloy located above the trunk portion of the rear part 120. The upper back 300 includes a bent portion 301 of which end is bent. The bent portion 301 is bent downward at an angle in a range of 120 degrees to 150 degrees with respect to the surface (the upper surface in the figure) of the upper back 300.

The rear frame 121 is made of a GA steel sheet and has a support portion 123 extending in the vehicle-width direction for placing the upper back 300. Since the support portion 123 of the rear frame 121 includes a stepped recessed portion in the same manner as the support portion 154 of the center frame 131 of the first embodiment, the surfaces of the joining portions can be flush with each other, so that the beautiful appearance can be maintained.

The bent portion 201 of the upper back 300 is placed on the support portion 123 of the rear frame 121 and is joined by welding the vicinity of an apex 302 of the bent portion 301 to the support portion 123. FCW is used for the welding.

In the same manner as the first embodiment, the upper back 300 may be made of 6000 series aluminum alloy, and the rear frame 121 may be made of a GI steel sheet, a hot-dip aluminum steel sheet, or a non-plated steel sheet.

In practice, joining of dissimilar materials is often performed for the vehicle body 10. In particular, since the roof panel 200 of the first embodiment or the upper back 300 of the second embodiment has a large area, substitution of aluminum alloy members for steel members is highly effective in weight reduction. However, in addition to the first and second embodiments, the present invention can be applied to various parts of the vehicle body 10. For example, the present invention can be applied to various parts, such as a spare tire well, doors, or a floor panel. Further, the present invention can be used for other than vehicles, and can be used for general transportation equipment, such as ships and railways.

The invention claimed is:

1. Structure including joint structure of dissimilar materials comprising:
   a first member which has a bent portion at its end and is a panel member made of an aluminum alloy; and
   a second member which has a support portion for supporting the first member and is made of steel, wherein
   the first member and the second member are joined by continuous welding of a vicinity of an apex of the bent portion of the first member and the support portion of the second member, and wherein
   a reinforcing plate is joined directly to the first member at least partially along the joining portion with the second member, and
   the reinforcing plate is spaced apart from the second member.

2. Structure including joint structure of dissimilar materials according to claim 1, wherein the continuous welding is a brazing joint using a flux cored wire.

3. Structure including joint structure of dissimilar materials according to claim 1, wherein the reinforcing plate is made of an aluminum alloy and joined to the first member with an adhesive.

4. Structure including joint structure of dissimilar materials according to claim 2, wherein the reinforcing plate is made of an aluminum alloy and joined to the first member with an adhesive.

5. Structure including joint structure of dissimilar materials according to claim 1, wherein the reinforcing plate is made of resin and joined to the first member with an adhesive.

6. Structure including joint structure of dissimilar materials according to claim 2, wherein the reinforcing plate is made of resin and joined to the first member with an adhesive.

7. Structure including joint structure of dissimilar materials according to claim 1, wherein the reinforcing plate is disposed with a gap from the joining portion between the first member and the second member.

8. Structure including joint structure of dissimilar materials according to claim 2, wherein the reinforcing plate is disposed with a gap from the joining portion between the first member and the second member.

9. Structure including joint structure of dissimilar materials according to claim 1, wherein the structure is a vehicle body.

10. Structure including joint structure of dissimilar materials according to claim 9, wherein the first member is a roof or an upper back of the vehicle body.

11. Structure including joint structure of dissimilar materials according to claim 2, wherein the structure is a vehicle body.

12. Structure including joint structure of dissimilar materials according to claim 1, wherein the first member is made of an aluminum alloy of 6000 series or 5000 series.

13. Structure including joint structure of dissimilar materials according to claim 2, wherein the first member is made of an aluminum alloy of 6000 series or 5000 series.

14. Structure including joint structure of dissimilar materials according to claim 1, wherein the second member is a hot dip galvannealed steel sheet, a hot-dip galvanized steel sheet, a hot-dip aluminum steel sheet, or a non-plated steel sheet, which is a surface-treated steel sheet.

15. Structure including joint structure of dissimilar materials according to claim 2, wherein the second member is a hot dip galvannealed steel sheet, a hot-dip galvanized steel sheet, a hot-dip aluminum steel sheet, or a non-plated steel sheet, which is a surface-treated steel sheet.

* * * * *